(12) United States Patent
Lee et al.

(10) Patent No.: US 12,272,812 B2
(45) Date of Patent: Apr. 8, 2025

(54) ELECTRODE ASSEMBLY MANUFACTURING METHOD INCLUDING STEP OF SIMULTANEOUSLY APPLYING HEAT AND PRESSURE

(71) Applicant: LG ENERGY SOLUTION, LTD., Seoul (KR)

(72) Inventors: Byeong Kyu Lee, Daejeon (KR); Su Taek Jung, Daejeon (KR); Soon Kwan Kwon, Daejeon (KR); Hyun Kyung Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/762,927

(22) PCT Filed: Oct. 6, 2020

(86) PCT No.: PCT/KR2020/013550
§ 371 (c)(1),
(2) Date: Mar. 23, 2022

(87) PCT Pub. No.: WO2021/080210
PCT Pub. Date: Apr. 29, 2021

(65) Prior Publication Data
US 2022/0393143 A1   Dec. 8, 2022

(30) Foreign Application Priority Data

Oct. 25, 2019   (KR) .......................... 10-2019-0133419

(51) Int. Cl.
*H01M 4/04* (2006.01)
*B32B 37/00* (2006.01)
(Continued)

(52) U.S. Cl.
CPC ....... *H01M 4/0435* (2013.01); *B32B 37/0053* (2013.01); *B32B 37/06* (2013.01);
(Continued)

(58) Field of Classification Search
CPC ..... B32B 37/08; B32B 37/0053; B32B 37/06; B32B 37/10; H01M 4/0435; H01M 4/04–0497
See application file for complete search history.

(56) References Cited

U.S. PATENT DOCUMENTS 9,748,547 B2 * 8/2017 Murase ............... H01M 50/406
2002/0134501 A1   9/2002 Fan et al.

FOREIGN PATENT DOCUMENTS

CN   105789678 A   7/2016
CN   108854339 A   5/2017
(Continued)

OTHER PUBLICATIONS

International Search Report (PCT/ISA/210) issued in PCT/KR2020/013550 dated Jan. 12, 2021.

*Primary Examiner* — Carson Gross
(74) *Attorney, Agent, or Firm* — Birch, Stewart, Kolasch & Birch, LLP

(57) ABSTRACT

Discussed is an electrode assembly manufacturing method including an operation of stacking an electrode and separator to form an electrode stack and an operation of laminating the electrode stack while heating the electrode stack in order to manufacture an electrode assembly having increased force of coupling between the electrode and the separator while preventing damage to the electrode assembly.

15 Claims, 3 Drawing Sheets

| (51) | Int. Cl. | | | JP | 2014-139896 A | | 7/2014 |
|---|---|---|---|---|---|---|---|
| | *B32B 37/06* | (2006.01) | | JP | 2016-4756 A | | 1/2016 |
| | *B32B 37/08* | (2006.01) | | JP | 2016004756 A | * | 1/2016 |
| | *B32B 37/10* | (2006.01) | | JP | 2019071178 A | * | 5/2019 |
| (52) | U.S. Cl. | | | JP | 2018-135899 A | | 8/2019 |
| | CPC .............. *B32B 37/08* (2013.01); *B32B 37/10* | | | JP | 2020102353 A | * | 7/2020 |
| | | | | KR | 10-1353496 B1 | | 1/2014 |
| | (2013.01); *B32B 2457/10* (2013.01) | | | KR | 10-1361675 B1 | | 2/2014 |
| | | | | KR | 10-2015-0048082 A | | 5/2015 |
| (56) | References Cited | | | KR | 10-2016-0047690 A | | 5/2016 |
| | | | | KR | 1020160023072 | * | 10/2016 |
| | FOREIGN PATENT DOCUMENTS | | | KR | 10-1767636 B1 | | 8/2017 |
| | | | | KR | 10-2018-0023185 A | | 3/2018 |
| CN | 206633556 U | 11/2017 | | KR | 10-2018-0068520 A | | 6/2018 |
| CN | 208167254 U | 11/2018 | | KR | 101888052 B1 | * | 8/2018 |
| CN | 208539012 U | 2/2019 | | KR | 10-2019-0055726 A | | 5/2019 |
| CN | 208873839 U | 5/2019 | | KR | 10-2019-0056812 A | | 5/2019 |
| JP | 2001-43848 A | 2/2001 | | KR | 10-2020973 B1 | | 9/2019 |
| JP | 2019-198948 A | 9/2010 | | WO | WO2018/008548 A1 | | 1/2019 |
| JP | 2010198948 A * | 9/2010 | | * cited by examiner | | | |

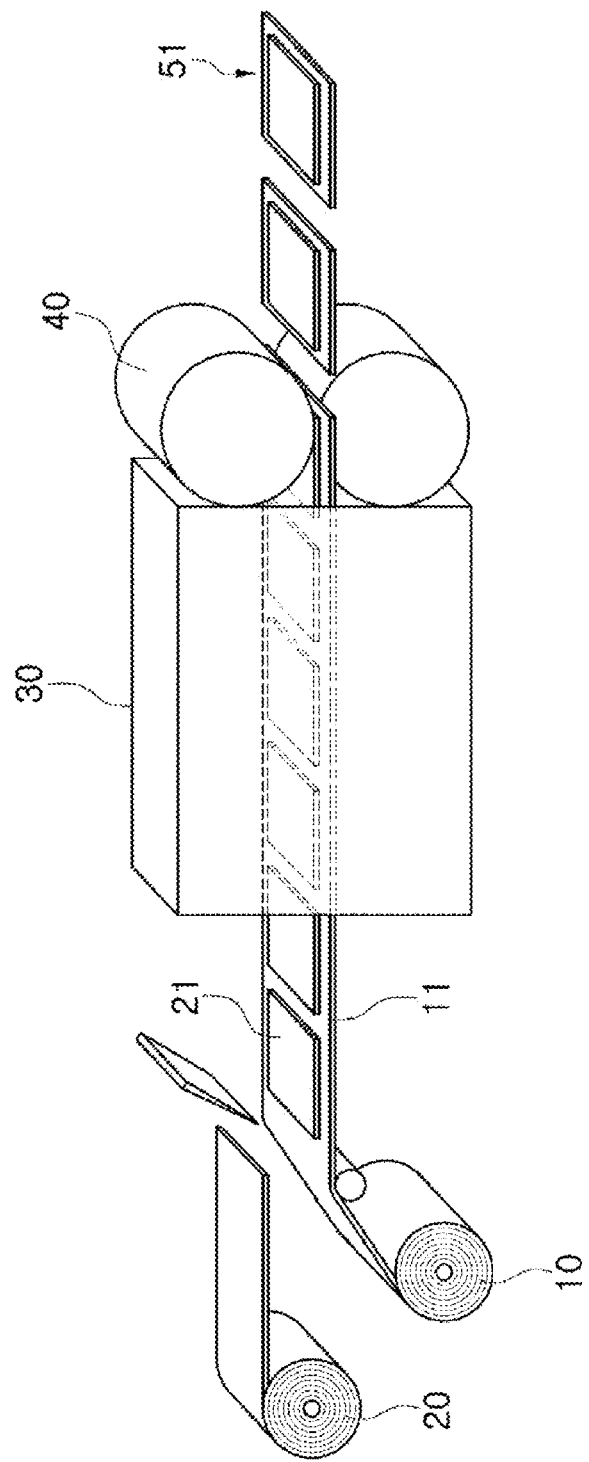
[FIG. 1] (CONVENTIONAL ART)

[FIG. 2]
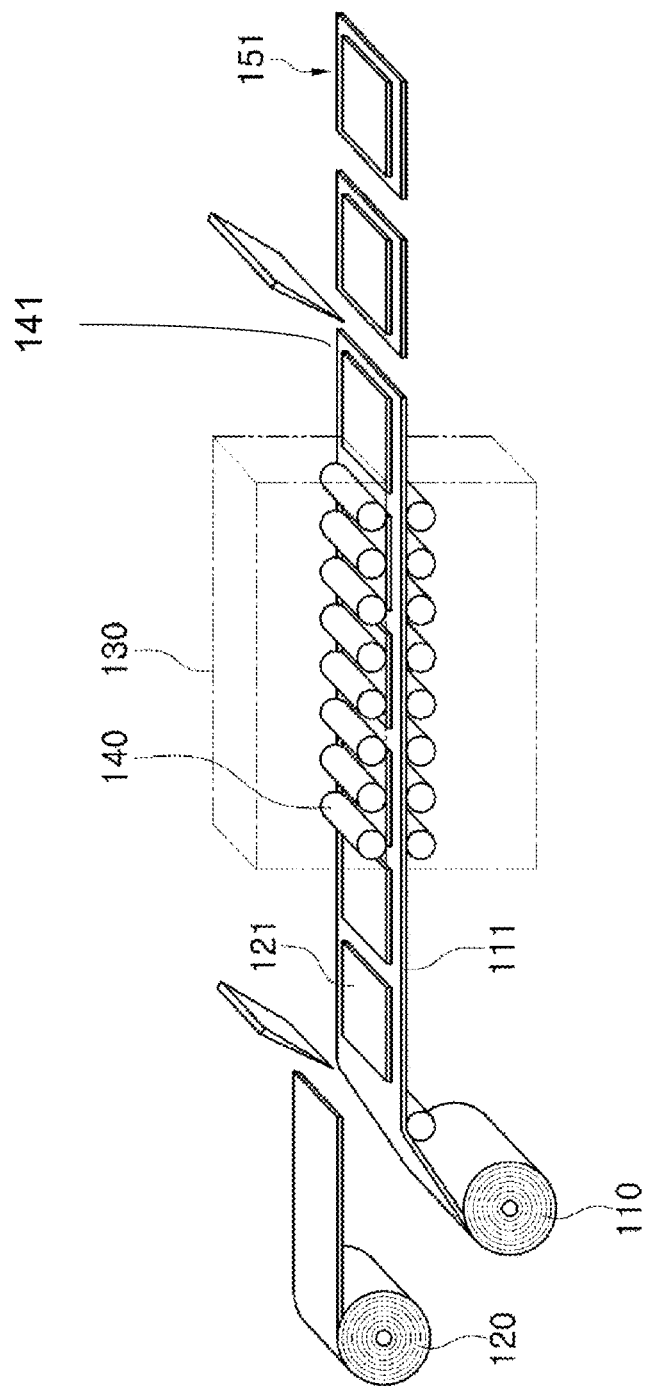

[FIG. 3]
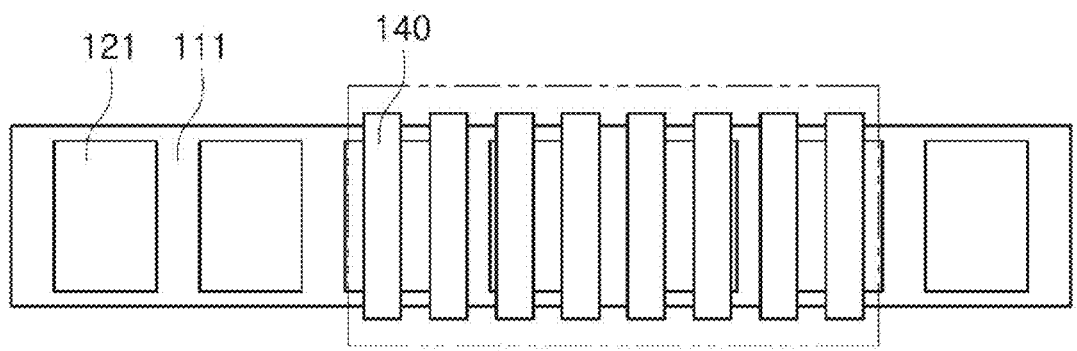
[FIG. 4]
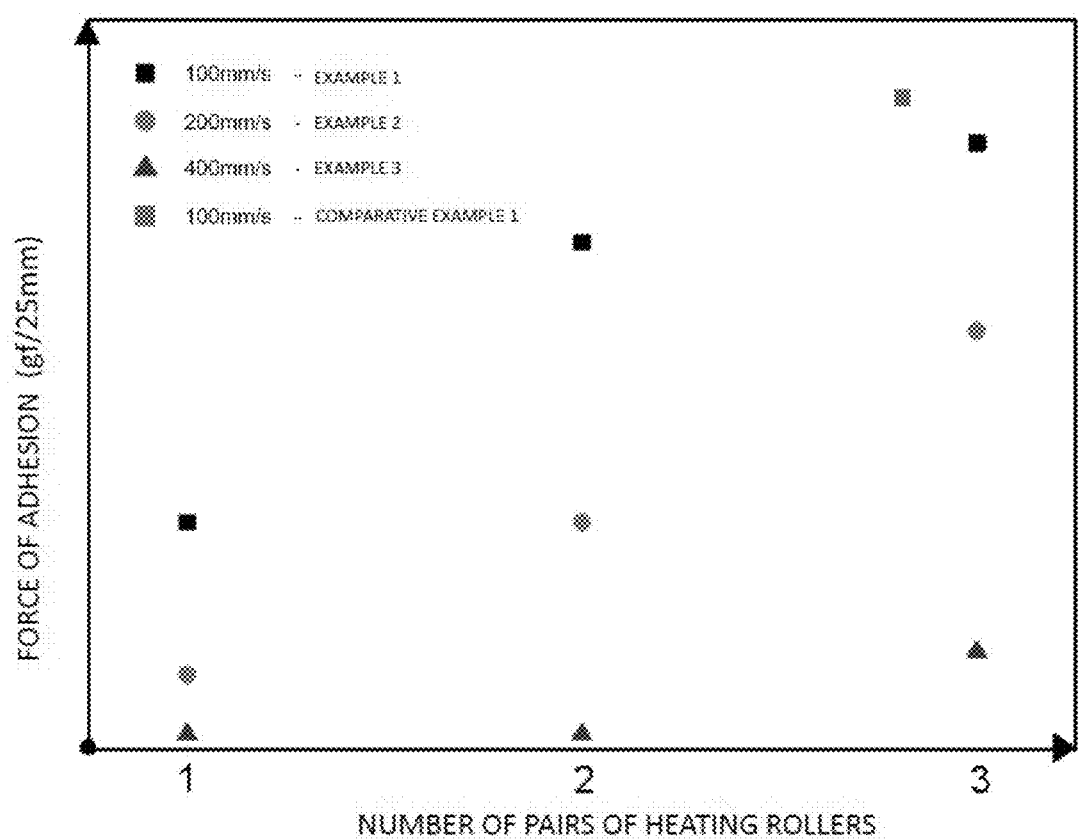

ELECTRODE ASSEMBLY MANUFACTURING METHOD INCLUDING STEP OF SIMULTANEOUSLY APPLYING HEAT AND PRESSURE

TECHNICAL FIELD

This application claims the benefit of priority to Korean Patent Application No. 2019-0133419 filed on Oct. 25, 2019, the disclosure of which is hereby incorporated by reference herein in its entirety.

The present invention relates to an electrode assembly manufacturing method, and more particularly to an electrode assembly manufacturing method of simultaneously applying heat and pressure in a step of laminating an electrode and a separator with each other at the time of manufacture of an electrode assembly.

BACKGROUND ART

A lithium secondary battery, which is capable of being repeatedly charged and discharged and has high energy density, has attracted attention as a new energy source having environmentally friendly characteristics, since the lithium secondary battery is capable of remarkably reducing the use of fossil fuels and generates no byproducts as the result of using energy.

The lithium secondary battery includes an electrode assembly having a positive electrode, a negative electrode, and a separator. The electrode assembly is classified as a jelly-roll type electrode assembly, in which a positive electrode and a negative electrode are wound round in the state in which a separator is interposed therebetween, a stacked type electrode assembly, in which a positive electrode, a separator, and a negative electrode are sequentially stacked, or a stacked/folded type or laminated/stacked type electrode assembly, which is a combination thereof.

In order to manufacture the electrode assembly, a lamination process of stacking an electrode and a separator and adhering the electrode and the separator to each other is performed. Conventionally, the lamination process and a heating process are separately performed.

In connection therewith, FIG. 1 is a perspective view schematically showing a conventional electrode assembly manufacturing process.

Referring to FIG. 1, there is shown a process of manufacturing a monocell consisting of a single electrode and a single separator. An electrode 21 separated from an electrode roll 20 and then cut is disposed on a separator sheet 11 separated from a separator roll 10. In this state, the electrode and the separator sheet are moved to a heating zone 30, in which a process of melting a thermoplastic material of the separator sheet and a thermoplastic material of the electrode is performed. Subsequently, the separator sheet 11 and the electrode 21, which are in a stacked state, are laminated while passing through a pressing zone using pressing rolls 40, whereby the electrode and the separator sheet are adhered to each other. The separator sheet is cut in the state in which the electrode is adhered to the separator sheet, whereby an electrode assembly 51 is completed.

However, in the case in which the heating zone and the pressing zone are separated from each other, as described above, there is a problem in that a separate space must be provided and there is a problem in that, since the pressing zone is shortened, high pressure is applied and thus the electrode assembly is damaged.

In connection therewith, Patent Document 1 discloses an electrode assembly manufacturing method, wherein the electrode assembly manufacturing method includes a surface treatment process of activating the surface of a separator sheet through corona discharge before a process of locating a unit cell on the separator sheet in order to increase the force of adhesion between the separator sheet and the unit cell.

Patent Document 2 discloses a lamination apparatus for manufacturing a secondary battery configured to apply heat to an electrode assembly having a structure in which a positive electrode and a negative electrode are sequentially stacked in the state in which a separator is interposed therebetween in order to laminate the electrode assembly, wherein the lamination apparatus includes a heating unit configured to supply heat to the electrode assembly, protective belts provided above and under a web on which electrode assembles are sequentially arranged in a longitudinal direction, the protective belts being configured to transfer heat supplied from the heating unit to the web, and a pair of pressing rollers disposed so as to transfer force of adhesion to the web heated by the heating unit.

In Patent Document 2, the protective belts, which can be repeatedly used by surface coating and a cleaning unit, are applied, whereby it is possible to remove consumable protective film used to protect the electrode assembly in the lamination process, and therefore it is possible to reduce manufacturing cost, which is an object thereof. However, this patent document does not disclose technology for increasing the force of adhesion between the electrode and the separator.

Patent Document 3 discloses a lamination apparatus for secondary batteries including a matching device, including a matching member configured to match an electrode and a separator and at the same time to primarily adhere the electrode and the separator to each other in order to prevent tilting of the electrode and a transfer member configured to transfer the primarily adhered electrode and separator, and a laminator configured to secondarily adhere the primarily adhered electrode and separator, transferred by the transfer member, in order to laminate the electrode and separator with each other. This patent document discloses technology for preventing tilting of the electrode in order to prevent a defective electrode assembly from being manufactured.

As can be seen from the above, the above prior art documents do not suggest a method of simplifying an electrode assembly manufacturing process, increasing the force of adhesion between an electrode and a separator, and minimizing damage to an electrode assembly. Therefore, there is a high necessity for solving such problems.

PRIOR ART DOCUMENTS (Patent Document 1) Korean Registered Patent Publication No. 1361675 (2014.02.05)
(Patent Document 2) Korean Patent Application Publication No. 2018-0023185 (2018.03.07)
(Patent Document 3) Korean Patent Application Publication No. 2019-0056812 (2019.05.27)

DISCLOSURE

Technical Problem

The present invention has been made in view of the above problems, and it is an object of the present invention to provide an electrode assembly manufacturing method capable of minimizing damage to an electrode assembly while simplifying an electrode assembly manufacturing process through integration of a heating zone and a pressing zone.

Technical Solution

In order to accomplish the above object, an electrode assembly manufacturing method according to the present invention includes (a) stacking an electrode and a separator to form an electrode stack and (b) laminating the electrode stack while heating the electrode stack.

Step (b) may include a process of applying pressure and heat to the electrode stack to laminate the electrode and the separator with each other using a heating roller constituted by a pair of an upper roller and a lower roller.

The heating roller may be provided in one or more pairs.

The temperature of the heating roller may be adjustable.

In addition, the magnitudes of pressing force applied to each of the pairs of heating rollers may be set to be different from each other.

The heating roller may include a first heating roller, configured to allow the electrode stack to pass therethrough first, to an n-th (n being an integer between 2 and 20) heating roller sequentially disposed therefrom, and pressing force may be gradually increased in a direction from the first heating roller to the n-th heating roller.

Rotational speeds of each of the pairs of heating rollers may be adjustable.

Step (b) may be performed in a heating zone in which the electrode stack is indirectly heated.

In addition, the heating roller may laminate the electrode stack while directly heating the electrode stack in the state of being heated due to indirect heating of the heating zone.

The electrode assembly manufacturing method may further include (c) cold-rolling the electrode stack after step (b).

In addition, at least two pairs of cooling rollers, each of which is constituted by an upper roller and a lower roller, may be included in step (c).

The electrode stack may be a single cell consisting of a single electrode and a single separator, a monocell having a separator interposed between a positive electrode and a negative electrode, or a bi-cell having two separators interposed respectively between three electrodes disposed such that adjacent electrodes have different polarities.

In a concrete example, step (b) may be repeatedly performed twice or more.

In addition, the present invention provides an electrode assembly manufactured by the electrode assembly manufacturing method and a secondary battery including the electrode assembly.

DESCRIPTION OF DRAWINGS

FIG. 1 is a perspective view schematically showing a conventional electrode assembly manufacturing process.

FIG. 2 is a perspective view schematically showing an electrode assembly manufacturing process according to the present invention.

FIG. 3 is a plan view showing a portion of the electrode assembly manufacturing process of FIG. 2.

FIG. 4 is a graph showing the results of Experimental Example.

BEST MODE

Now, example embodiments of the present invention will be described in detail with reference to the accompanying drawings such that the example embodiments of the present invention can be easily implemented by a person having ordinary skill in the art to which the present invention pertains. In describing the principle of operation of the example embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition in this specification may be applied to all inventions, unless particularly restricted, and does not limit a specific invention.

Hereinafter, an embodiment of the present invention will be described in detail with reference to the accompanying drawings.

FIG. 2 is a perspective view schematically showing an electrode assembly manufacturing process according to the present invention, and FIG. 3 is a plan view showing a portion of the electrode assembly manufacturing process of FIG. 2.

Referring to FIGS. 2 and 3, there is shown a process of manufacturing a monocell composed of a single electrode and a single separator. An electrode 121 separated from an electrode roll 120 and then cut is disposed on a separator sheet 111 separated from a separator roll 110 to form an electrode stack 141. When the electrode stack moves to a heating zone 130, the electrode stack passes through heating rollers 140 configured to apply pressure to the electrode stack while applying heat to the electrode stack, whereby the electrode and the separator sheet are laminated with each other.

Subsequently, the separator sheet is cut from the electrode stack, which consists of the electrode and the separator sheet laminated with each other, to complete an electrode assembly 151.

Although FIG. 2 shows the process in which the electrode is stacked on the separator sheet to form the electrode stack, an electrode may be stacked on a separator cut as a unit separator to form an electrode stack and then the above lamination step may be performed.

In the following description, a separator is used to form an electrode stack, wherein the separator encompasses not only a separator but also a separator sheet.

In addition, although FIGS. 2 and 3 show the monocell manufacturing process, the electrode assembly according to the present invention may be a single cell composed of a single electrode and a single separator, a monocell having a separator interposed between a positive electrode and a negative electrode, or a bi-cell having two separators interposed respectively between three electrodes disposed such that adjacent electrodes have different polarities. Each of the monocell and the bi-cell includes a configuration in which a separator is further added to the other surface of each electrode that does not face the separator interposed between the electrodes.

The lamination step includes a process of applying pressure and heat to the electrode stack to laminate the electrode and the separator with each other using a heating roller constituted by a pair of an upper roller and a lower roller. Since the heating roller directly heats the electrode and the separator, it is possible to easily adjust the temperature of the heating roller such that the temperature of the heating roller reaches the melting temperature of a thermoplastic material included in the electrode and the separator and it is possible to improve efficiency in heat transfer from the heating roller to the electrode and the separator.

At least one pair of heating rollers may be provided. Specifically, at least two pairs of heating rollers may be provided. As shown in FIGS. 2 and 3, eight pairs of heating rollers may be disposed at the outer surfaces of the electrode and the separator so as to be brought into direct contact with each other. Alternatively, n (n being an integer between 2 and 20) heating rollers may be sequentially disposed in order of a first heating roller, through which the electrode stack passes first, to an n-th heating roller.

The temperature of the heating roller may be adjusted. Specifically, the temperatures of several pairs of heating rollers may be set such that the temperature of each pair of heating rollers is different from the temperatures of the other pairs of heating rollers. Temperature may be gradually increased in order of the first heating roller to the n-th heating roller, or temperature may be gradually decreased in order of the first heating roller to the n-th heating roller. Alternatively, the pair of heating rollers having relatively high temperatures and the pair of heating rollers having relatively low temperatures may be alternately disposed.

Alternatively, the temperatures of the heating rollers may be set such that the temperature of each heating roller configured to contact the electrode and the temperature of each heating roller configured to contact the separator are different from each other.

In a concrete example, the magnitude of pressing force applied to each of the pairs of heating rollers may be set so as to be different from each other. In the case in which pressing force is gradually increased in order of the first heating roller to the n-th heating roller, pressure applied to the electrode and the separator at the initial stage is low, whereby it is possible to prevent the electrode from being separated from the separator. In addition, since pressing force is sufficiently high at the rear end, it is possible to secure the force of coupling between the electrode and the separator.

Meanwhile, in the present invention, the pressing process and the heating process are simultaneously performed, and the plurality of pairs of heating rollers is used. Time for which pressure is applied to the electrode and the separator is set so as to be long such that pressure is uniformly distributed to the electrode stack, whereby it is possible to improve quality of the electrode assembly.

In connection therewith, the rotational speeds of each of the pairs of heating rollers may be adjusted in order to increase or decrease time for which pressure is applied to the separator. The rotational speed of the heating roller may be adjusted so as to be low or high for each period of the lamination step in consideration of the temperature of each pair of heating rollers and the materials for an electrode mixture and the separator.

Consequently, the lamination process may be performed for an electrode stack including any of various kinds of electrodes and separators.

In a concrete example, step (b) may be performed in a heating zone in which the electrode stack is indirectly or secondarily heated.

That is, step (b) may be performed in a manner in which the electrode and the separator are directly or primarily heated using the heating rollers heated at a place other than the heating zone or may be performed in a manner in which the electrode stack is directly heated using the heating rollers heated while the electrode stack passes through the heating zone.

The heating rollers may laminate the electrode stack while directly heating the electrode stack in the state of being heated due to indirect heating of the heating zone. Alternatively, a method of directly heating the electrode stack using the heating rollers heated by a separate energy source in addition to the heating temperature of the heating zone may be used.

The present invention may further include a step (c) of cold-rolling the electrode stack after step (b), wherein at least two pairs of cooling rollers, each of which is constituted by an upper roller and a lower roller, may be included in step (c).

In the case in which the electrode stack is cold-rolled, as described above, the thermoplastic material included in the electrode and the separator returns from a molten state, in which the thermoplastic material is heated by the heating rollers, to a solid state. The crystallization form of the thermoplastic material may be adjusted in order to improve product uniformity and quality stabilization of the electrode assembly.

Since the electrode stack is laminated using the plurality of heating rollers, the present invention has the effect of lengthening the pressing time, whereby pressure applied to the electrode and the separator is dispersed, and therefore it is possible to inhibit damage to the electrode and the separator. In addition, step (b) may be repeatedly performed twice or more in order to further improve the above effect.

Hereinafter, the present invention will be described with reference to the following examples. These examples are provided only for easier understanding of the present invention and should not be construed as limiting the scope of the present invention.

Example 1

A positive electrode having a positive electrode mixture applied to Al foil was stacked on one surface of a polyolefin-based separator sheet, and a lamination process was performed while an electrode stack was moved so as to pass through a pair of heating rollers heated to 60° C. at a speed of 100 mm/s in the state in which a pressure of 0.1 Kgf/cm$^2$ was applied thereto.

For comparison the difference in the force of adhesion based on the number of pairs of heating rollers, the lamination process was performed while the number of pairs of heating rollers was changed to 1, 2, and 3.

Example 2

A lamination process was performed in the same manner as in Example 1 except that the speed at which an electrode stack passed through the heating rollers was changed from 100 mm/s in Example 1 to 200 mm/s.

Example 3

A lamination process was performed in the same manner as in Example 1 except that the speed at which an electrode stack passed through the heating rollers was changed from 100 mm/s in Example 1 to 400 mm/s.

Comparative Example 1

A positive electrode having a positive electrode mixture applied to Al foil was stacked on one surface of a polyolefin-based separator sheet, and an electrode stack was moved so as to pass through a heating zone at 60° C.

Subsequently, a lamination process was performed while the electrode stack, in which the positive electrode was stacked on the separator sheet, was moved so as to pass between a pair of heating rollers configured to apply a pressure of 0.2 Kgf/cm$^2$ to the electrode stack.

Measurement of Force of Adhesion

The separator sheet was cut from the electrode stack laminated according to each of Examples 1 to 3 and Comparative Example 1 to manufacture a unit electrode stack.

Distal ends of the separator and the positive electrode of the unit electrode stack were mounted to UTM equipment (LLOYD Instrument LF Plus), and force necessary to separate the positive electrode from the separator was measured while force was applied in opposite directions in the state in which measurement speed was set to 300 mm/min.

FIG. 4 shows the results of Experimental Example, wherein forces of adhesion based on the number of pairs of heating rollers at different speeds are shown.

Referring to FIG. 4, it can be seen that force of adhesion decreases as speed is increased and that force of adhesion increases as the number of pairs of heating rollers is increased.

That is, FIG. 4 shows the result that, as the number of times that the electrode stack passes through the heating rollers and time for which the electrode stack passes through the heating rollers increase, time for which pressure is applied to the electrode stack increases, whereby force of adhesion increases.

Meanwhile, the electrode stack according to Comparative Example 1, in which the heating process and the pressing process are separately performed, exhibits force of adhesion similar to that of the electrode stack according to Example 1, in which the electrode stack passed through three pairs of heating rollers at a speed of 100 mm/s, even though the magnitude of pressing force is twice the magnitude of pressing force in Examples. Since the magnitude of pressing force of the electrode stack according to Comparative Example 1 is twice the magnitude of pressing force of each of the electrode stacks according to Examples, however, there is a possibility of the electrode stack being damaged during the pressing process, and therefore it is preferable that heat and pressure be simultaneously applied using heating rollers, as in Examples exhibiting similar force of adhesion even though relatively low pressing force is applied.

Also, in the case in which the number of pairs of heating rollers is greater than 3, force of adhesion is expected to further increase, and therefore it is possible to secure higher force of adhesion by increasing the number of pairs of heating rollers.

Consequently, in the case in which lamination is performed while an electrode stack is pressed and at the same time is directly heated using a plurality of heated heating rollers, as in the present invention, it is possible to simplify the process. In addition, it is possible to secure high force of adhesion even in the case in which pressure applied to the electrode stack is reduced, whereby it is possible to minimize damage to the electrode stack.

Those skilled in the art to which the present invention pertains will appreciate that various applications and modifications are possible within the category of the present invention based on the above description.

DESCRIPTION OF REFERENCE NUMERALS 10, 110: Separator rolls
11, 111: Separator sheets
20, 120: Electrode rolls
21, 121: Electrodes
30, 130: Heating zones
40: Pressing rolls
51, 151: Electrode assemblies
140: Heating rollers

INDUSTRIAL APPLICABILITY

As is apparent from the above description, in an electrode assembly manufacturing method according to the present invention, an electrode and a separator are simultaneously heated and pressed when a lamination process of coupling the electrode and the separator to each other is performed, whereby it is possible to simplify the process, compared to the case in which heating and pressing are performed as separate processes.

In addition, the electrode and the separator are directly heated, whereby it is possible to easily adjust the temperature of a heating zone such that the temperature of the heating zone reaches the melting temperature of a thermoplastic material constituting the electrode and the separator.

In addition, the heating zone and a pressing zone are integrated, whereby the process is performed for a relatively long time in the pressing zone. Furthermore, since pressure is applied to the electrode and the separator using a plurality pairs of rollers, it is possible to reduce the magnitude of force applied to the electrode and the separator and to set pressing time so as to be long, whereby it is possible to prevent damage to the electrode and the separator.

The invention claimed is:

1. An electrode assembly manufacturing method comprising:
   operation (a) of stacking an electrode and a separator to form an electrode stack; and
   operation (b) of laminating the electrode stack while simultaneously heating the electrode stack,
   wherein operation (b) comprises a process of applying pressure and heat to the electrode stack to laminate the electrode and the separator with each other using pairs of heating rollers,
   wherein magnitudes of pressing force applied to each of the pairs of heating rollers are set to be different from each other, wherein:
   the pairs of heating rollers comprise a first pair of heating rollers to an n-th pair of heating rollers, the first pair of heating rollers being configured to allow the electrode stack to pass therethrough first, and to the n-th pair of heating rollers sequentially disposed from the first pair of heating rollers, n being an integer between 3 and 20, and
   the pressing force is gradually increased in a direction from the first pair of heating rollers to the n-th pair of heating rollers.

2. The electrode assembly manufacturing method according to claim 1, wherein temperatures of the pairs of heating rollers are adjustable and are different from each other.

3. The electrode assembly manufacturing method according to claim 1, wherein rotational speeds of the each of the pairs of heating rollers are adjusted to increase or decrease time for which the pressing force is applied to each of the pairs of the heating roller based on the temperatures of the pairs of heating rollers that are different from each other.

4. The electrode assembly manufacturing method according to claim 1, wherein operation (b) is performed in a heating zone in which the electrode stack is secondarily heated.

5. The electrode assembly manufacturing method according to claim 4, wherein the pairs of heating rollers laminate the electrode stack while directly heating the electrode stack in a state of being heated due to the secondary heating of the heating zone.

6. The electrode assembly manufacturing method according to claim 1, further comprising operation (c) of cold-rolling the electrode stack after operation (b).

7. The electrode assembly manufacturing method according to claim 6, wherein, in operation (c), the cold-rolling is performed by at least a pair of cooling rollers, each pair of which is constituted by an upper roller and a lower roller.

8. The electrode assembly manufacturing method according to claim 1, wherein the electrode stack is a single cell comprising a single electrode and a single separator, a monocell having a separator interposed between a positive electrode and a negative electrode, or a bi-cell having two separators interposed respectively between three electrodes disposed such that adjacent electrodes have different polarities.

9. The electrode assembly manufacturing method according to claim 1, wherein, in operation (b), simultaneous applying of pressure and heat to the electrode stack is repeatedly performed twice or more.

10. The electrode assembly manufacturing method according to claim 1, wherein each pair of heating rollers is constituted by an upper roller and a lower roller.

11. The electrode assembly manufacturing method according to claim 1, wherein operation (b) comprises a process of applying pressure and heat to the electrode stack to laminate the electrode and the separator with each other using the pairs of heating rollers, and wherein each pair of heating rollers includes an upper roller and a lower roller to apply pressure and heat to the electrode stack from opposite sides of the electrode stack, respectively.

12. The electrode assembly manufacturing method according to claim 11, wherein the pairs of heating rollers are arranged at predetermined intervals.

13. The electrode assembly manufacturing method according to claim 12, wherein the predetermined interval is less than a length of the electrode in an assembly direction of the electrode assembly manufacturing method.

14. The electrode assembly manufacturing method according to claim 11, wherein the pairs of heating rollers contact the electrode during operation (b).

15. The electrode assembly manufacturing method according to claim 2, wherein the temperatures of the pairs of heating rollers either increase or decrease in sequence or alternate between relatively high temperatures and relatively low temperatures.

\* \* \* \* \*